United States Patent [19]

Boujon, deceased et al.

[11] Patent Number: 4,953,016
[45] Date of Patent: Aug. 28, 1990

[54] TABLE-SHAPED JIG FOR POSITIONING ELEMENTS ON A SUPPORT IN ACCORDANCE TO A REFERENCE LAYOUT

[75] Inventors: Gerard Boujon, deceased, late of Pully, Switzerland, by Yves Boujon, Jacqueline Boujon, executors; Yves Boujon, Lausanne; Jacqueline Boujon, Pully, both of Switzerland

[73] Assignee: Bobst SA, Switzerland

[21] Appl. No.: 359,889

[22] Filed: Jun. 1, 1989

[30] Foreign Application Priority Data

Jun. 1, 1988 [CH] Switzerland .................. 02082/88

[51] Int. Cl.$^5$ .............................................. H04N 7/18
[52] U.S. Cl. .................................... 358/93; 358/101; 358/229
[58] Field of Search ....................... 358/93, 101, 229; 382/8

[56] References Cited

U.S. PATENT DOCUMENTS

| 2,976,357 | 3/1961 | Hammett | 358/229 |
| 4,596,037 | 6/1986 | Bouchard et al. | 358/101 |
| 4,727,179 | 2/1988 | Schanalfuss | 358/229 |
| 4,751,570 | 6/1988 | Robinson | 358/228 |

Primary Examiner—Howard W. Britton
Assistant Examiner—Kim Yen Vu
Attorney, Agent, or Firm—Hill, Van Santen, Steadman & Simpson

[57] ABSTRACT

A table-shaped jig for positioning elements on a support in accordance with a reference layout characterized by a reference plane receiving the reference layout, a first camera mounted for movement above the reference plane, a support plane for receiving a support for the elements, a second camera positioned above said support plane and being mounted for movement in a second plane and an arrangement for causing the second camera to move in a following relationship to movement of the first camera and an electronic arrangement for superimposing the images from the two cameras on a screen.

9 Claims, 2 Drawing Sheets

TABLE-SHAPED JIG FOR POSITIONING ELEMENTS ON A SUPPORT IN ACCORDANCE TO A REFERENCE LAYOUT

BACKGROUND OF THE INVENTION

The present invention is directed to a table-shaped jig for positioning elements on a support according to a reference layout. The invention is directed specifically to a table jig which enables the accurate arrangement of embossing plates on a chase, which is destined to be, thereafter, inserted into a machine designed for converting or embossing material, such as sheets or webs.

Embossing is an operation which has an engraved embossing plate with a configuration pressed either cold or hot against paper or a board mash to cause a relieved ornamentation impression. Effected also with the virgin paper, however, this operation is more often usually used in the practical sense, in many cases in which an additional application of a foil is provided on a preprinted paper with color motifs or designs with an enhancing and, thus, highlighting certain printed areas. This involves, however, a high precision positioning of the plates on their case or support with a tolerance of no more than a quarter of a millimeter, which tolerance depends on the prints on the paper or the printable film.

In order to achieve this operation, the operator uses the printing plate layout available in the form of a transparent film showing the corresponding areas of the various plates arranged in alignment with appropriate marks in the flat position on the chase. The images are, thus, fixed on only one side.

At that stage, the operator is then able to place them embossing plates successively on the film in order to shift them individually to a point of the chase corresponding to the printed image on the film. When viewing through the film, the operator is then able to, more or less, adjust the position of the plates before securing them on the chase. However, the observer can realize that the accuracy of such a position depends on the accuracy of the film position with regard to the chase, which can no longer be reliably accurate on account of the fact that the film has to be raised in order to allow the insertion of the plates between the film and the surface of the chase. Moreover, the initial film is likely to become damaged when being frequently manipulated during successive arrangement of the embossing plates on the chase.

The operation would even become more hazardous if only one opaque printed sheet should be available. In fact, for the reasons of coincidence with the direction of the printing process, the sheet is to be arranged on the chase with its printed side turned against the latter. Previously, the operator is to cut out, from the sheet in the area of every print to be embossed, one or several windows, generally of a triangular shape and of which one of the apexes will be directed towards a characteristic part of the motif or design. Proper positioning of the embossing plates inserted between the sheet and the chase can, thus, only be achieved by viewing across these windows, which is often times awkward.

The operator would then mount the equipped chase into the machine and carry out some test prints in order to determine if corrections in the position of the plates must be made. Depending on the complication of the motif or the design, several test prints and correlations might be necessary. This shows how the preparation of the chase or the embossing support is likely to consume a certain time of, say, four hours, during which the machine is not operational. Moreover, this operation would ultimately lead to marginal precision, only with regard to the arrangement of the embossing plate.

SUMMARY OF THE INVENTION

The principle of the present invention is to obviate the above-mentioned problems by proposing a particular work table which enables a highly precise arrangement with the tolerance of 0.2 mm for the embossing plates on their chase and, besides that, is so easy that the total operating time for positioning the embossing plates will be cut to an average of a half of an hour. The jig table, as specified by the present invention, should, moreover, enable the operator to arrange the plates by considering such external parameters as the operating temperature of the chase or the degree of humudity of the sheets being processed, which will render possible by a simple initial setting action, which will remove the operator from any further adjustment operations.

These goals can be obtained by means of a table-shaped jig designed for positioning elements on a support in accordance with a reference layout. The table includes a tray on which a reference layout can be arranged, a first video camera, first mounting means for mounting the video camera for movement in a plane parallel to the layout, said first mounting means including a crossbar movable along the tray, a first electro-mechanical means for moving the crossbar along the tray, a carriage supporting said camera being movable along said crossbar, a second electro-mechanical means for moving the carriage along said crossbar; positioner means for actuating the first and second electro-mechanical means for shifting the first video camera in said plane parallel to said layout; an operating plane for holding a chase in a steady position in a second plane, a second video camera, second means for mounting the second video camera for movement in a plane parallel to said second plane, said second mounting means including a bracket movable along the second plane, a third electro-mechanical means for moving said bracket along said plane, an arm movable along said bracket and supporting said second video camera, and fourth electro-mechanical means for moving said arm on said bracket; electronic means used for controlling the third and fourth electro-mechanical means for shifting the bracket and the arm of the second video camera in such a way that the second camera will be shifted proportional to the first video camera's movement which is commanded by said positioner means, said electronic means including a first detector means fitted on the carriage for detecting the movement of the carriage along said crossbar, a second detector means fitted on said crossbar for detecting movement of the crossbar along said tray, a third detector means mounted on said arm for detecting movement of the arm along said bracket, fourth detector means mounted on said bracket for detecting movement of said bracket along said second plane; and electronic video mixing control means for receiving the output of the first and second video cameras and for displaying said output on a screen, said electronic video control means enabling the transformation of the images recorded by each of said video cameras into color, contrast, brightness and enlarged signals before combining them by selectively superposition and vertical, horizontal, circular and rectangular juxtaposition on the visual screen.

According to a first embodiment of realizing the invention, at least one of the electro-mechanical means can include an electronic motor fitted on a movable member, such as the crossbar, the bracket, the carriage and arm, and having a pinion with a mesh engagement with a rack fitted lengthwise on the corresponding supporting member for the movable member.

According to a second embodiment of utilizing the structure, at least one of the electro-mechanical means may include a toothed belt with both ends secured on either side of the movable member, which belt forms a loop around two toothed gears, a motor rotating one of said toothed gears for shifting the movable member relative to the position of the motor. A third embodiment for the electro-mechanical means includes an electric motor mounted on a supporting member having a worm gear supported for rotation, said worm gear having a corresponding threaded sleeve mounted on said movable member so that rotation of the worm gear causes movement of the threaded sleeve and member.

Each of the detecting means can include a detector which is mounted on the movable member and is linked to a ruler secured lengthwise on the corresponding supporting arm, such as either the tray, the plane, the crossbar or the bracket in such a way that the detector will always remain opposite the ruler when the movable member is shifted. The detector can have the form of a photoelectric cell and the ruler can be provided with detectable graduations. The detector can also be a U-shaped permanent magnet containing a solenoid in a central section and arranged on the ruler in such a way as to be able to close the loop of the magnetic circuit. The ruler has a thickness varying in the linear direction, depending on its length so that changes in the thickness of the ruler indicates change in the linear position of the detector relative to the ruler.

Preferably, the electronic control means includes two identical parallel sections, of which one controls the shifting of the arm and the other the shifting of the bracket. Each of these control sections includes a differentiator, which compares the signals emitted, for example by the two detectors determining the movement of the crossbar and bracket, or by the two detectors determining the movement of the carriage and arms, and determines the difference of the two movable members and the direction of this difference. Each section has a compensatory circuit for transforming an output signal or error signal of the differentiator into a modified signal in view of an appropriate external parameter as those applied to the additional circuit from a potentiometer. Each section has a circuit means for establishing the direction and the amount of movement necessary to position the two cameras in the desired position in view of the modified signal and a servo-amplifier for transforming the signal from the circuit means into electrical energy to be applied to the electric motor of the electro-mechanical means to shift the second camera to a position to coincide with the position of the first camera.

Other advantages and features of the invention will be readily apparent from the following description of the preferred embodiments, the drawings and the claims.

DESCRIPTION OF THE PREFERRED EMBODIMENTS

Figure 1:
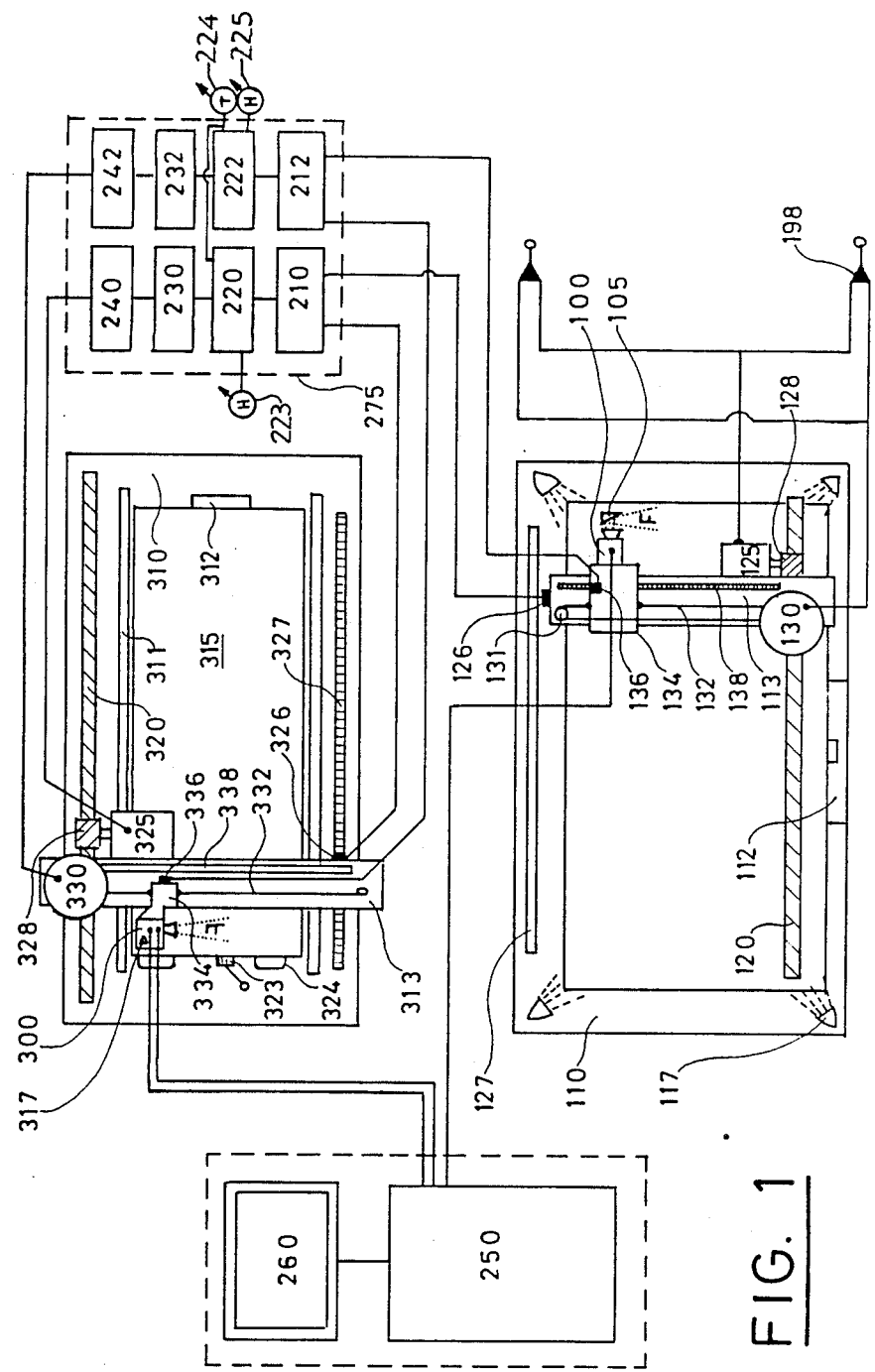
FIG. 1 is a diagrammatical view of the table-shaped jig in accordance with the present invention.
Figure 2:
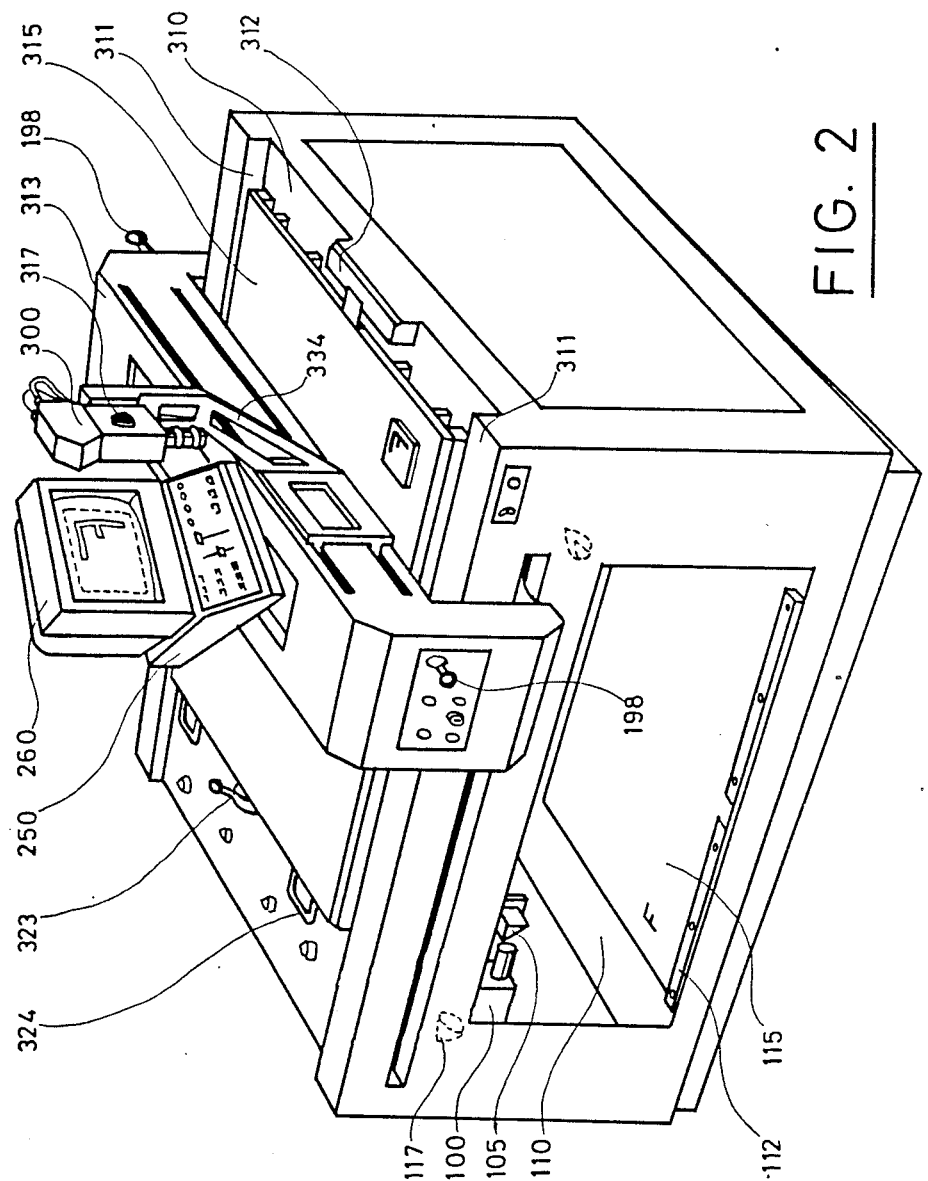
FIG. 2 is a perspective view of a table-shaped jig according to the invention.

The principles of the present invention are particularly useful when incorporated into a jig table or table-shaped jig, illustrated in FIGS. 1 and 2. The jig table includes a first tray 110, on which the user is to place a reference layout 115 in alignment with the center line of a ruler 112. After having been adjusted, the reference layout 115 is fitted on the tray, either by means of underlying suction system, adhesive tape arranged on the sides or by other means leaving the upward facing printed surface free from any obstructions.

The jig table also includes an upper operating plane or table 310 with a centering stop 312 on the right-hand side, as illustrated in FIGS. 1 and 2. A support or honeycomb steel chase 315, for example a plate containing a great number of hook-on apertures is locked and centered against the centering stop 312 by a locking element 323, which acts on the opposite end or side of the chase. In order to facilitate moving the chase or support 315 on the upper operating plane or table 310, the operating place can be provided with underlying carrier ball tracks, such as 324.

A first video camera 100 is equipped with a prism 105 in front of its lens and is shifted over the reference layout 115 by first mounting means, which includes a carriage 134 movable along a crossbar 113 which, in turn, is movable crossbar over the tray 110 on underlying (not illustrated) rails which extend beneath the operating table 310. To shift the carriage 134 on the crossbar 113, an eletro-mechanical means is provided. As illustrated in FIG. 1, this first electro-mechanical means includes a belt system 132 which forms a loop around two toothed wheels or gears 131 (only one of which is shown). One of the belt wheels 131 (the one which is not shown) is positioned underneath a motor 130 and is connected on the output shaft thereof. Rotation of the electrical motor in either a clockwise or counterclockwise directiom will cause the carriage 134 to be shifted along the crossbar 113. The crossbar 113 is shifted by a second electro-mechanical means, which is illustrated as including an electrical motor 125 which is mounted on the crossbar 113 and has a pinion 128, whose teeth are meshed with a rack gear 120, which is mounted on the tray 310 and, as illustrated in the embodiment of FIG. 2, is mounted on the bottom surface of the upper plane which forms the operating plane or table 310.

The second video camera 300 is mounted by second mounting means, which includes an arm 334 which is shiftable along rails on a bracket 313 which, in turn, is movable crosswise on rails along the operating table 310. To shift the arm 334, a third electro-mechanical means, which includes an inner toothed belt system 332 actuated by an electrical motor 330 is provided. The bracket 313 is moved by an electrical motor 325, which is mounted on the bracket and drives a pinion 328 whose teeth are meshed with a rack gear 320, which itself is mounted relative to the operating table 310.

As illustrated, the motors 125 and 130 cause the movement of the camera 110 and the actuation of these motors is controlled by a positioner, such as a joystick 198. As illustrated in FIGS. 2, two joysticks are provided on each side of the jig, and either one can be operated to cause both motors 125 and 130 to be actuated to shift the camera 100 in its plane.

The position of every movable member with regard to its supporting member, for example the carriage 134 relative to the crossbar 113, the crossbar 113 relative to the tray 110, the arm 334 relative to the bracket 313, and the bracket 313 relative to the operating plane or table 310, is determined by detector means 126, 136, 326 and 336, relative. Each of these detector means has a detector mounted on the movable member and a ruler is mounted on the supporting member opposite the position of the detectors and extends parallel to the shifting direction or axis of the movable member. In line with this consideration for reliability and cost, the detector may be a simple photo-electric cell shiftable in front of a graduated ruler or a more complex electro-magnetic system including a permanent horseshoe magnet having arms which are shifted on either side of a ruler showing a thickness variation in a linear direction. This variation of the thickness is perceived by the solenoid arranged around the permanent magnet in the center area.

The electrical motors 325 and 330 will determine the position of the second video camera 300 and are controlled by an electronic means 275 in such a way that the movement of the second video camera 300 will be identical along the bracket to those of the first video camera 100 travelling along the crossbar and be exactly inversed along the plane 310 with regard to the movement carried out by the first video camera along the tray 110. This inversion of the movement along the plane is due to the fact that the chase 315 is arranged on the operating table with its front side directed upwards, whereas in operation in the embossing machine or printing press, its front side will be directed downward. Thus, the chase 315 in the jig has been rotated through 180 degrees relative to its position in the operating apparatus.

As illustrated in FIG. 1, the control means 275 are divided up into two identical and parallel sections. One section controls the motor 325 and the other section controls the motor 330.

The first section for controlling the motor 325 includes a differentiator 210, which receives signals from the detector means 126 to indicate the position and movement of the crossbar 113 relative to the rule 127 and also receives signals from the detector 326 to determine the position and movement of the bracket 313 with reference to the ruler 327. The differentiator 210 is capable of establishing quantitively the difference movements carried out by botbh the crossbar and the bracket. This difference or error signal is compensated in a circuit 220 which is a compensation that has a single output and at least two inputs, to form a modified error signal in accordance with external parameters, such as an embossing temperature or humidity of the paper being used. These parameters are entered by variable potentiometers, such as 224 and 223. The shifting direction, as well as the amount of movement to be carried out by the bracket 313 is then established by a circuit 230 which is a transducer giving an electrical information relative to linear movement and could be either a step by step resistance or a rheostat, and the output of the circuit 230 is converted by the servo-amplifier 240 into electrical energy applied to the motor 325 to cause rotation of the motor the desired amount in either a clockwise or counterclockwise direction.

The second section includes a differentiator 212 which receives an output signal from the detector 136 to indicate the position of the carriage 134 with regard to the ruler 138, which is positioned on the crossbar 113 and also receives the output from the detector 336, which determines the position of the arm 334 with regard to the ruler 338, which is mounted on the bracket 313. The comparison formed by the differentiator 212 will produce an error signal with the difference between the position of the carriage 134 and the arm 334, and this difference or error signal is then processed in a compensator of a compensation circuit 222, where input parameters, such as for temperature and humidity, form a modified error signal which is converted into direction and amount by the control circuit 232, which can be a divider or a multiplier, which could be an operational amplifier and whose output goes to the servo-amplifier 242 to drive the motor 330.

A possibility for independent correction between the x axis and the y axis is provided by using potentiometers, such as 223 and 225 for correcting for the humidity rate independent of each other. The potentiometer 224 applies the same input to both circuits 220 and 222. Owing to the electronic control means 275, the user is able to control the position of the camera 100 situated above the reference 115 by means of the positioner or joystick 198, whereas the camera 300 will follow and move above the chase 315 in response to changes in the position of the first camera 100.

The lenses of the cameras 100 and 300 should, preferably, have a fixed focus, with the focus length being determined in such a way as to be able to exactly insure an identical image relationship. So, for instance, a focal length of 50 mm for the cameras 100 and 300 will insure a quadruple linear enlargement, whereas a focal length of 24 mm results in a 1.5 enlargement. If a user is compelled by one or the other jobs to cover different surfaces varying within extreme limits, both cameras can be provided with lenses with varying focal length settings, though this is more difficult. Although this would not be an absolute necessity, it has been suggested to be more appropriate to fix the diaphragm of both lenses to a given size and to modify the light intensity of the lamps 117 and 317, as required.

The cameras 100 and 300 are both connected to a mixing control 250, which is linked to a visualization or display screen 260. The mixing control 250 is situated underneath the screen 260 and is, for practical reasons, arranged on a rotary plate which itself is mounted on top of the bracket 313, with which it will move. A second connection links the mixing control 250 to the camera 300 and, thus, allows a tuning of the scan mode of this camera with the scan mode of the camera 100. Due to the mixing control arrangement, the images provided by both cameras can, at a first stage, have their contrast, brightness and colors modified before they are combined, at a second stage, on the screen 260, whether by superimposing or juxtapositioning, which may be either vertical, horizontal or circular. This way of combining the images of this display screen is essentially adapted to the motif or design on the embossing plates. The combination of the images can also be inverted on the display screen, which action will later on allow for a coinciding of the screen images with the real positioning direction of the object lying on the jig table. In other words, the action will allow the movement of the hand in a given direction on the jig table to appear in the same direction on the screen. This inversion is obtainable by modifying the features of the display screen 260.

As described above, the jig table, according to the invention, is utilized in the following way:

A chase 315, as presented in FIGS. 1 and 2, is approached from the left and then engaged into the centering device 312 before being locked by the fixture 323.

The operator then positions the camera, as required by the dimensions of the chase 315 that is being used. In fact, the center line of the reference layout 115 is, in all cases, aligned with the central mark of the stop 112 itself fitted on the tray, whereas the chase 315 is always pressed against the right-hand stop 312 on the operating plane. In this way, the center line of the chase 315 shifts more or less to the right, depending on the its particular size.

In order to carry out this positioning action, the operator starts by putting a first target in a central position of the ruler 112 of the tray and then a second target on the center line of the chase which is to be centered. As this chase has a standard dimension, the various positions of the center line can be marked beforehand on the jig table by apertures destined to take up a center pin of the second target.

With the targets secured, the operator actuates the manipulator or positioning device 198 in such a way as to have the camera 300 move above the second target, regardless of any shifts effectuated by the first camera 100. The position of the second camera may be considered as satisfactory when the image of the second target appears in the center of the display screen 260.

At this stage, the operator disconnects the two cameras and thereby renders the control means 275 inoperative with a switch, which is not illustrated. The operator then orders the mixing control by an appropriate switch not to show, for the time being, the image originating from the first camera 100. By actuating the manipulator or positioning device 198, he then moves the first camera 100 above the first target in such a way that its image will also appear in the screen center. Thereupon, he actuates the mixing control 250 to have appear the two target images simultaneously on the screen 260. At this stage, the manipulator or positioning device 198 enables him to adjust the ultimate position of the camera 100 in order to have the image of the two targets coincide on the screen 260. With this action accomplished, the position of the two cameras is considered as fully adjusted relative to each other and the control means 275 are again, switched on and interlocked by means of the switch. Then the targets are withdrawn.

The fixed reference layout 115 is now arranged on the tray 100 and then fixed, either by means of a lower suction system or crosswise by means of adhesive tape or any other means which is transparent, to prevent any covering-up of the printed surface of the reference layout 115 which is turned toward the camera.

The operator adjusts the light intensity of the halogen lamps 117 as required by the background color of the reference layout 115, and the color and the contrast of the printed parts so that he can adjusts the intensity of the lamps 317 with regard to the color and contrast of the embossing plates acting in such a way as to have the two images on the screen 260 provided with sufficient contrast. If the result is still unsatisfactory, the operator is able, owing to the mixing control 250, to replace a natural color on the screen for either the part or plate by an artificial but better recognizable color.

The chase preparation can now be commenced. To this aim, the operator is to shift the camera 100 by actuating the positioning means or device 198 in such a way that the image F of a printed motif or design on the reference layout 115 will appear on the display screen 260. To begin with, the image of the motif F is reversed by the prism 105 in order to take into account both the alignment and the inversion of the chase 315 on the pre-setting table compared to its position with regard to the sheet to be embossed in the printing press.

Simultaneously, though without the operators intervening in whatsoever a way, the position of detectors 126 and 136 record the distance covered by the camera 100 as required in the course of its movement. The amount of movements are signalled to the differentiators 210 and 212, whose circuits will immediately compute a difference of the positions F for the carriage 134/arm 334 and for the crossbar 113/bracket 313. These differentiators generate immediately in each section a signal representing the differences resulting from the various instantaneous movements carried out by the two cameras. These differences, which are in the form of error signals, can be modified by outside parameters, such as temperature and humidity, by the circuits 220 and 222 to produce a modified or new error signal which will be discussed hereon. The modified or new error signal will then be applied to the circuits 330 and 340 which, depending on the axis considered, will bring about an inversion or an identical signal. An inversion will occur with one of the axes, for example for the movement between the crossbar 113 and the bracket 313 to take into consideration the direction of the chase 315 as positioned on the operating plane with regard to its real position within the printing press. The servo-amplifiers 240 and 242 take the output signals from the circuits 230 and 232 and convert these signals into electrical energy directly applied to the motors 325 and 330, which will shift the bracket 313 and the arm 334 respectively in such a way that it will follow the movement of the crossbar 113 and carriage 134 proportionally. Once the camera 100 has come to a standstill, the camera 300 will equally stop above the sole position of the chase 315 corresponding to the position of the motif or design F on the reference layout.

If, at this stage, the images of the two cameras 100 and 300 do not coincide on the screen 260, the operator is to actuate the mixing control 250 in order to obtain such a coincidence. Moreover, he is able to position the embossing plate manually under the camera 300 in such a way that the plate image as read by the camera 300, will appear with accurate coincidence with the image of the precedently printed motif F. Once this coincidence has been obtained, the operator has the certainty that the embossing plate is accurately positioned on the chase and can, thus, be fixed in this accurate position.

Subsequently, the operator is then to shift the first camera 100 above a second printed motif F by actuating the positioner 198 with the second camera 300 following simultaneously this movement above the chase 315. When the camera 100 will have stopped again, in such a way that the second motif F will appear on the screen 260, the second camera 300 will be fixed by the control means 275 exactly above the chase at a position corresponding to this position of the first camera. In this way, the operator is able to arrange a second embossing plate on the chase so that its image is scanned by the camera 300 and will coincide with the first image on the screen 260. Thereupon, the plate can be fixed on the chase in this second position.

As already mentioned in the preface, such embossing operations are mostly carried out with heat input for the temperature varying between 80° and 140° C. by heating the whole chase unit 315 with the embossing plates.

Thus, if the embossing plates are to be accurately positioned after they have been heated up to the operating temperature, they should be slightly closer than actually necaessary to one another when at the ambient temperature, at which time the chase is prepared. For example, if the two plates, which will be operated at 220° C., have two motifs F situated at a distance of 1 meter apart on the reference layout, then the corresponding embossing plates should be slightly closer to one another by 1.2 mm when at ambient temperature of 20° C. Although this difference is appreciable in extreme positions, it is, nonetheless, a mere minimum between the adjacent plates and, hence, hard to control manually. On the other hand, the positioning table of the present invention is provided with complementary circuits 220 and 222 among the electronic control means 275 which enable the correction of such misalignments. To this aim, the operator, before proceeding to the first position on the plate, is to select the required temperature for the use of the chase by turning the potentiometer, such as 224, with its degree/double degree gradations causing the circuits 220 and 222 to shorten the movement of the camera 300 as spotted by the detectors 126 and 136 with a proportionally corresponding to 1.2 mm per meter with each range of 100 degrees.

A second phenomenon likely to impair the setting of the embossing chase and well known in the trade, is represented by the amount of humidity of the sheets to be embossed. In fact, a sheet has a tendency to retract or shrink when getting drier to such a point that it is necessary to readjust the position of the embossing plates. As stated previously, such a correction can be applied by the circuits 220 and 222 after putting in the degree or amount of humidity on the two potentiometers 223 and 225.

If the shrinkage changes are anisotropical, the necessity arises to provide a differentiated readjustment along the axes x and y. Tell-tale lamps, though not illustrated, will then signal permanently the use of such compensatory actions. In the event that the amount of change along the x axis is different than the y axis, the input by the potentiometers 223 and 225 can be different.

Although various minor modifications may be suggested by those versed in the art, it should be understood that I wish to embody within the scope of the patent granted hereon all such modifications as reasonably and properly come within the scope of my contribution to the art.

I claim:

1. A table-shaped jig for positioning elements on a support in accordance with a reference layout, said jig including a tray on which a reference layout can be arranged; a first video camera; first mounting means for mounting the video camera for movement in a plane parallel to the reference layout, said first mounting means including a crossbar movable along the tray, a first electro-mechanical means for moving the crossbar along the tray, a carriage supporting said camera being movable along said crossbar, and a second electro-mechanical means for moving the carriage along said crossbar; positioning means for actuating the first and second electro-mechanical means for shifting the first video camera in said plane parallel to said layout; an operating plane for holding a chase in a steady position in a second plane; a second video camera; second mounting means for mounting the second video camera for movement in a plane parallel to said second plane, said second mounting means including a bracket movable along the operating plane, a third electro-mechanical means for moving said bracket along said operating plane, an arm movable along said bracket and supporting said second video camera, and a fourth electro-mechanical means for moving said arm on said bracket; electronic means used for controlling the third and fourth electro-mechanical means for shifting the bracket and arm of the second mounting means in such a way that the second camera will be shifted proportional to the movement of the first video camera which is commanded by said positioning means, said electronic means including a first detector means for detecting the movement of the carriage along said crossbar, a second detector means for detecting the movement of the crossbar along said tray, third detector means for detecting movement of the arm along said bracket, and fourth detector means for detecting movement of said bracket along said second plane; and electronic video mixing control means for receiving the ouptput of the first and second camera and for displaying said output on a screen, said electronic video control means enabling the transformation of the images recorded by each of the video cameras and the color, contrast, brightness and enlarged signals before combining them by selectively superpositioning and vertical, horizontal, circular and rectangular juxtapositioning on the visual screen.

2. A table-shaped jig according to claim 1, wherein at least one electro-mechanical means includes an electric motor mounted on a movable member, said electric motor having a driving pinion with teeth meshed with a fixed lengthwise extending rack gear mounted on a supporting member for said movable member.

3. A table-shaped jig according to claim 1, wherein at least one of the electro-mechanical means includes a toothed belt having both ends secured to a movable member to form a loop extending around two gears mounted for rotation on a supporting member for the movable member, one of said two gears being driven by a motor to cause the movable member to be shifted on said supporting member.

4. A table-shaped jig according to claim 1, wherein at least one of the electro-mechanical devices includes a worm gear mounted on a supporting member, a threaded sleeve received on said worm gear being connected to a movable member, a motor for rotating said worm gear so that the threaded sleeve and the movable member are shifted along the supporting member.

5. A table-shaped jig according to claim 1, wherein at least one of the detector means includes a detector element mounted on a movable member selected from the carriage, the arm, the crossbar and the bracket and a ruler fitted lengthwise on a corresponding support member associated with the movable member so that the detector element is always opposite the ruler when the movable member is shifted.

6. A table-shaped jig according to claim 5, wherein the detector element is a photo-cell and said ruler is a graduated ruler.

7. A table-shaped jig according to claim 5, wherein the detector element is a U-shaped permanent magnet including a solenoid at a central part of said magnet, said magnet being arranged above the ruler in such a way that the ruler closes the loop of the magnetic circuit and said ruler in a linear direction having a varying thickness, depending on its length.

8. A table-shaped jig according to claim 1, wherein the electronic means includes two identical parallel sections, with one of said sections controlling the shifting of the arm and the other of the two sections controlling the shifting of the bracket, each of said sections including a differentiator for receiving signals from the detector means associated with said movable member of both the first mounting means and the second mounting means, said differentiator evaluating the shift of the pair of movable members and providing an error signal; a compensating circuit receiving said error signal and converting the error signal into a modified error signal in response to input for an exterior parameter; a second circuit receiving the modified error signal and determining the direction and amount of movement required for the second mounting means depending on the modified error signal, and a servo-amoplifier translating the output of the second circuit into electric energy applied to a motor used for shifting the movable member relative to the supporting member.

9. A table-shaped jig according to claim 8, which includes at least one potentiometer having a variable output, said variable output being connected to the compensating circuit for adding an outside parameter to create the modified error signal.

* * * * *